May 15, 1945.   H. M. EVJEN   2,375,777
ELECTRICAL PROSPECTING SYSTEM
Filed April 29, 1943
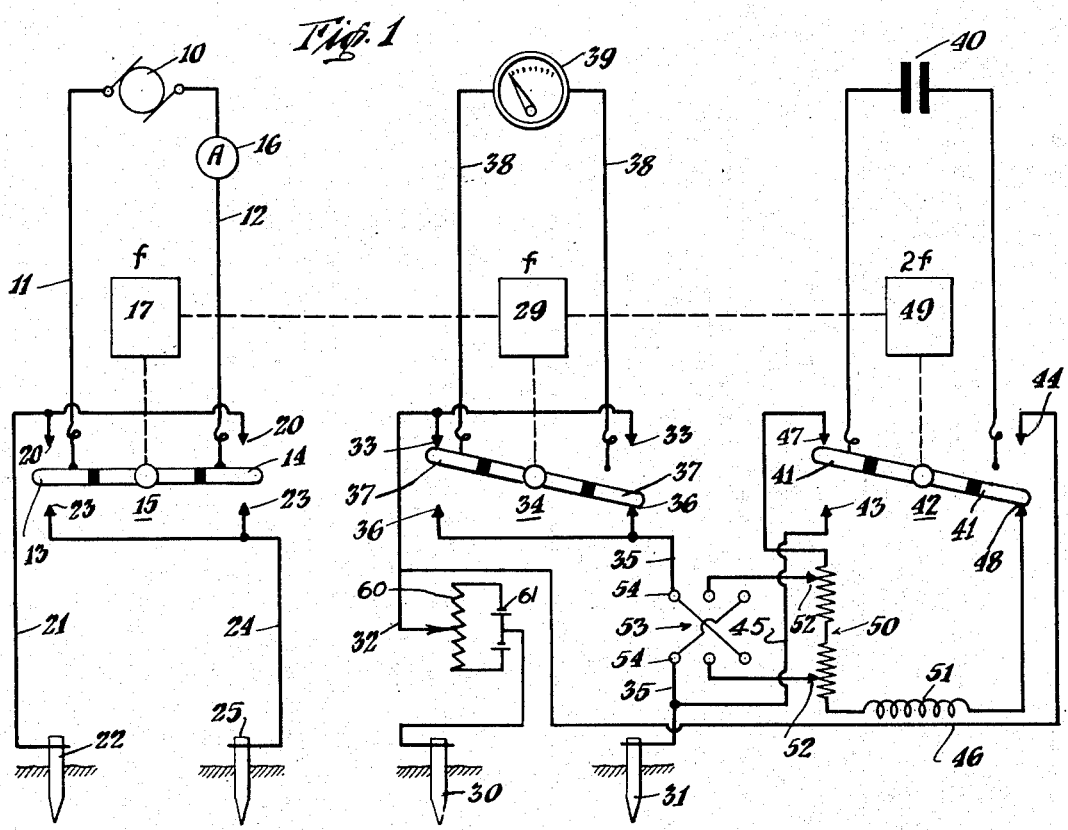
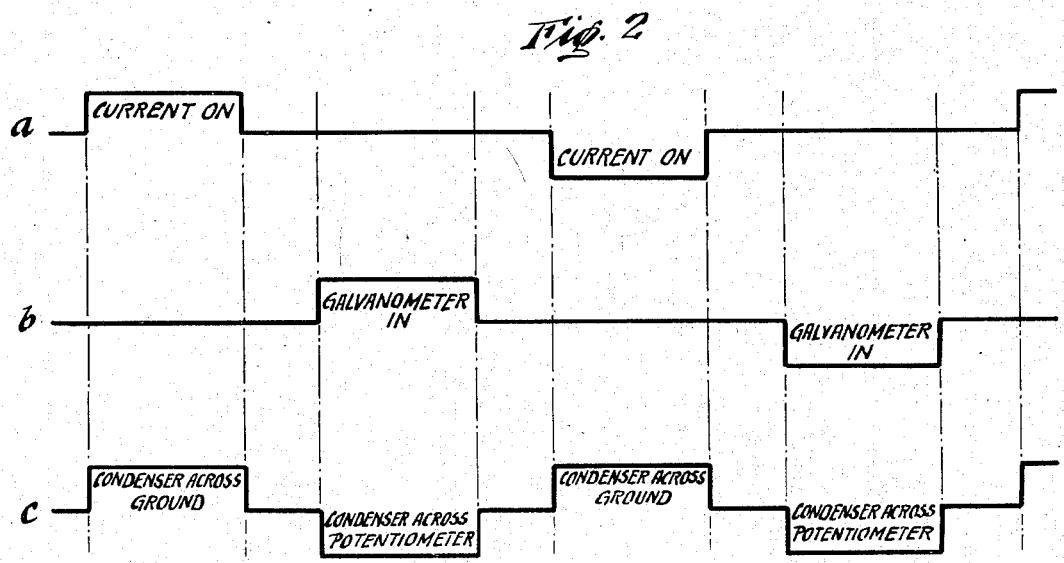
INVENTOR.
Haakon M. Evjen
BY
ATTORNEY

UNITED STATES PATENT OFFICE 2,375,777

ELECTRICAL PROSPECTING SYSTEM

Haakon M. Evjen, Houston, Tex., assignor to Nordel Corporation, Houston, Tex., a corporation of Delaware Application April 29, 1943, Serial No. 484,990

5 Claims. (Cl. 175—182)

This invention relates to systems for making geo-physical explorations wherein a current having a controlled low frequency of the order of from one-half cycle to 20 cycles per second is passed through the earth between spaced electrodes and the ground potential is picked up by a pair of potential electrodes located within the field of influence of the earth current.

I have now discovered that when a commutated current is passed into the ground the potential difference between any two fixed points in the ground will generally not be in phase with the current. A phase displacement will exist which varies with the frequency of alternation or commutation of the current. From the manner in which this phase displacement varies with frequency useful deductions can be drawn concerning the presence of valuable minerals in the ground. Such measurements are particularly significant at very low frequencies where the ordinary alternating current technique will not produce satisfactory results.

The present invention provides a system for the direct measurement at very low frequencies of a quantity which is a function of the phase angle between the alternating current passed into the ground and the potential drop existing between any two points within the field of influence of the ground current. Such points may comprise electrodes placed in contact with the ground at any location on the surface of the earth or in bore holes. The current is periodically interrupted and reversed as by a commutator or motor driven switch to provide an alternating current in the form of spaced flat-topped pulses.

A current pulse of definite duration is passed into the ground in one direction. The current is then interrupted for a definite period of time, hereinafter called the current gap, and is then passed into the ground in the opposite direction, after which the current is again interrupted and the cycle repeated. For convenience and, by analogy to usual alternating current terminology, the tangent of the phase angle is defined as the ratio of the time average of the potential drop between given points during a current gap interval to the time average of the potential drop between said points while the current is passed through the current electrodes into the ground or, expressed in another way, the ratio between the out-of-phase picked-up potential to the in-phase picked-up potential.

It is an object of the present invention to provide a novel and improved system for measuring the above mentioned ratio.

Another object is to provide a geophysical prospecting system having novel and improved characteristics.

Various other objects and advantages will be apparent as the nature of the invention is more fully described.

The invention will be better understood by referring to the following description, taken in connection with the accompanying drawing in which a specific embodiment thereof has been set forth for purposes of illustration.

In the drawing,

Fig. 1 is a diagrammatic representation of a geophysical prospecting system embodying the present invention; and Fig. 2 is a series of curves illustrating the operation of the system shown in Fig. 1.

In the following description certain specific terms have been used for convenience in referring to various details of the invention. It is to be understood, however, that these terms are to be given as broad an interpretation as the state of the art will permit.

Referring to the drawing more in detail, a source 10 of direct current is connected by means of lines 11 and 12 to movable contacts 13 and 14 respectively of a motor-driven reversing switch 15, which may be of any suitable type, for example, of the type set forth in Evjen Patent 2,314,874, dated March 30, 1943, which shows a switch adapted to reverse the circuit connections at a predetermined frequency and having an adjustable gap or clearance to control the times of reversal, the current intervals, and the gap intervals. The switch may be driven by suitable means indicated diagrammatically at 17. An ammeter 16 is shown as connected in the line 12 for purposes of regulation and control.

The reversing switch 15 is shown as provided with a pair of stationary contacts 20 connected by a line 21 to an earth current electrode 22, and with a pair of stationary contacts 23 connected by a line 24 to a second earth current electrode 25.

The potential pick-up circuit comprises a pair of pick-up electrodes 30 and 31 which are located within the field of influence of the earth current. The pick-up electrode 30 is connected by a line 32 to stationary contacts 33 of a second reversing switch 34 which is similar to the switch 15 above referred to and is driven by driving mechanism indicated at 29. The pick-up electrode 31 is connected by a line 35 to stationary contacts 36 of said switch 34. The movable contacts 37 of said switch 34 are connected by lines 38 to a direct current measuring instrument 39 shown as a null balance galvanometer.

The measuring circuit comprises a condenser 40 connected to the movable contacts 41 of a reversing switch 42 which is similar to the reversing switches 15 and 34 above described and is driven by suitable mechanism indicated at 49. Stationary contacts 43 and 44 of the reversing switch 42 are connected by lines 45 and 46 to lines 35 and 32 respectively. Stationary contacts 47 and 48 of the said reversing switch 42 are connected in a series circuit comprising potentiometer 50 and impedance 51. The potentiometer 50 is provided with adjustable contacts 52 which are connected to the blades of a manual reversing switch 53. The switch 53 is provided with stationary contacts 54 which are connected in series with the line 35.

The reversing switches 15 and 34 are interconnected for operation in unison, but 90° out of phase, so that the contacts of one switch are closed while the contacts of the other switch are open and vice versa. The reversing switch 42 is connected to be driven at double the speed of the switches 15 and 34 and is so adjusted that the contacts 47 and 48 are closed when the contacts of the reversing switch 34 are closed, and the contacts 43 and 44 are closed when the contacts of the reversing switch 15 are closed.

The sequence of operation of the reversing switches is illustrated in curves A, B and C in Fig. 2. Curve A represents the current passed into the ground from electrodes 22 and 25 and it will be noted that the current is passed through the ground in one direction during a period of 60°, is interrupted for an interval of 120° and is then passed through the ground in the opposite direction for a period of 60°.

The curve B in Fig. 2 indicates the operation of the reversing switch 34, which is set for 60° measuring intervals and 120° gap intervals. The current intervals are offset, however, to occur at the center of the gap intervals of curve A and vice versa, so that the potential pick-up circuit may be considered to be operated 90 electrical degrees out of phase with respect to the earch current circuit.

The operation of the reversing switch 42 is indicated by curve C in Fig. 2. It will be noted that the contacts 43 and 44 are closed to connect the condenser 40 directly across the potential pick-up electrodes 30 and 31 during the 60° current period of the earth current circuit. Hence, the condenser 40 is thus charged to a potential proportional to the amount of in-phase potential which is picked up by the electrodes 30 and 31. The contacts 47 and 48 of the reversing switch 42 are closed, however, during the 60° period that the reversing switch 34 is closed. During this period the condenser 40 discharges through the circuit including the potentiometer 50 and the impedance 51 to produce a potential drop across the potentiometer 50 which is proportional to the in-phase picked-up charging potential. An adjustable portion of this potential drop between the contacts 52 is applied to the measuring circuit to oppose the out-of-phase potential picked up by the pick-up electrodes 30 and 31. The direction of this potential drop may be reversed if necessary by the manual reversing switch 53 and the contacts 52 are adjusted to obtain a null balance of the galvanometer 39. When this balance is effected, the position of the contacts 52 is a direct indication of the ratio between the in-phase picked-up potential and the out-of-phase picked-up potential, which corresponds to the phase angle.

These measurements are repeated at different frequencies by varying the speed of operation of reversing switches 15, 34 and 42 and a log of the variation of phase angle with frequency is thus obtained.

It has been found that the presence of oil and other valuable minerals in the ground causes significant anomalies in the phase angle. The behavior of the phase angle with variations in frequency can thus be used as a direct indication of the presence of these materials.

The reversing switch 34 serves as a rectifier to rectify the potential impulses which are picked up by the pick-up electrodes 30 and 31 and thus permits the use of a direct current measuring instrument, such as the galvanometer 39.

Any residual earth current which would tend to cause fluctuation of the galvanometer 39 may be balanced out if desired by a suitable adjustable source of direct potential which may be connected in the potential pick-up circuit on the electrode side of the switch 34, for example a variable resistor 60 connected across a battery 61 the midpoint of which is connected to the electrode 30. Such potential, if used, may be so adjusted as to eliminate fluctuation in the galvanometer 39. If desired, the switch 34 may be adjusted to short circuit the galvanometer 39 during potential gap intervals so as to prevent potential surges when the reversing contacts close.

Although certain specific embodiments of the invention have been shown for purposes of illustration, it is understood that the invention is not to be restricted thereto but is capable of various uses as will be readily apparent to a person skilled in the art. The invention is to be limited only in accordance with the scope of the following claims.

What is claimed is:

1. A system for electrical prospecting comprising an earth current circuit including a source of direct current, a pair of spaced earth electrodes and a motor driven reversing switch connected between said source and said electrodes for interrupting and reversing the earth current at a predetermined controlled low frequency with definite adjustable gap periods at each interruption, a potential circuit including potential pick-up electrodes located at spaced points lying within the field of influence of said earth current, a D. C. potential indicating device connected to said pick-up electrodes to indicate the potential impressed thereby on said potential circuit, a reversing switch driven in unison with said first reversing switch and connected in said potential circuit between said pick-up electrodes and said indicating device, said last reversing switch being displaced in phase with respect to said first reversing switch for closing said potential circuit only when said first switch is in open position and vice versa and being timed to convert the potential picked-up during said closed circuit periods into a uni-directional potential suited to actuate said indicating device, a potentiometer, a condenser, a third reversing switch driven in unison with said first two reversing switches but operating at double the frequency thereof, said third reversing switch having connections to connect said condenser across said potential pick-up electrodes for charging and other connections to connect said condenser across said potentiometer for discharging to produce a potential drop in said potentiometer proportional to the charging potential, said last reversing switch being timed to connect said condenser across said pick-up electrodes during earth current periods and to connect said condenser across said potentiometer during potential measuring periods, and connections connecting a selected portion of said potentiometer in said potential circuit in a direction such that the potential drop therein opposes the picked-up potential.

2. A system for electrical prospecting comprising an earth current circuit including a source of direct current, a pair of spaced earth electrodes and a motor driven reversing switch connected between said source and said electrodes for interrupting and reversing the earth current at a predetermined controlled low frequency with definite adjustable gap periods at each interruption, a potential circuit including potential pick-up electrodes located at spaced points lying within the field of influence of said earth current, a D. C. potential indicating device connected to said pick-up electrodes to indicate the potential impressed thereby on said potential circuit, a reversing switch driven in unison with said first reversing switch and connected in said potential circuit between said pick-up electrodes and said indicating device, said last reversing switch being displaced in phase with respect to said first reversing switch for closing said potential circuit only when said first switch is in open position and vice versa and being timed to convert the potential picked up during said closed circuit periods into a uni-directional potential suited to actuate said indicating device, a potentiometer, a condenser, a third reversing switch driven in unison with said first two reversing switches but operating at double the frequency thereof, said third reversing switch having connections to connect said condenser across said potential pick-up electrodes for charging and other connections to connect said condenser across said potentiometer for discharging to produce a potential drop in said potentiometer proportional to the charging potential, said last reversing switch being timed to connect said condenser across said pick-up electrodes during earth current periods and to connect said condenser across said potentiometer during potential measuring periods, connections connecting a selected portion of said potentiometer in said potential circuit in a direction such that the potential drop therein opposes the picked-up potential and means adjusting said selected portion to balance said picked-up potential and obtain a null balance of said D. C. indicating device at which point the setting of said potentiometer is a measure of the phase angle of the picked-up potential with respect to the earth current.

3. A system for electrical prospecting comprising an earth current circuit including a source of direct current, spaced earth current electrodes and connections supplying current from said source to said electrodes for passing a current through the earth, means in said circuit to interrupt and reverse said current at a controlled low frequency with controlled current gap periods at each interruption during which no current flows, a potential circuit including potential pick-up electrodes located at spaced points within the field of influence of said earth current, and a measuring circuit connected to said pick-up electrodes, said measuring circuit comprising a potential measuring instrument, switch means timed with said interrupting and reversing means to connect said measuring instrument across said pick-up electrodes only during current gap periods, a resistor, a condenser, timed switch means to connect said condenser alternately across said pick-up electrodes for charging during earth current periods and across said resistor for discharge during said current gap periods to develop in said resistor a potential drop proportional to the potential picked-up during said earth current periods, means applying a selected portion of said potential drop to said measuring instrument in a direction to oppose the picked-up potential applied thereto during said current gap periods, and means adjusting said selected portion to balance said last potential.

4. A system for electrical prospecting comprising an earth current circuit including a source of direct current, spaced earth current electrodes and connections supplying current from said source to said electrodes for passing a current through the earth, means in said circuit to interrupt and reverse said current at a controlled low frequency with controlled current gap periods at each interruption during which no current flows, a potential circuit including potential pick-up electrodes located at spaced points within the field of influence of said earth current, and a measuring circuit connected to said pick-up electrodes, said measuring circuit comprising a D. C. potential measuring instrument, interrupting and reversing means timed with said first interrupting and reversing means to connect said measuring instrument across said pick-up electrodes only during current gap periods and to reverse the connections to said measuring instrument at successive current gap periods to rectify the picked-up potential induced by said earth current, a potential responsive circuit, means timed with said first interrupting means to connect said last circuit to said pick-up electrodes during successive earth current flow periods, means in said last circuit to derive a potential proportion to the potential picked up during said successive earth current periods, and means timed with said second interrupting and reversing means to apply said derived potential to said measuring instrument in a direction and at a time to oppose the picked-up potential applied thereto from said pick-up electrodes during said current gap periods to afford thereby a highly sensitive indication of their relative values.

5. The method of electrical prospecting which comprises passing through the earth a current in the form of a series of similar pulses, successive pulses being in opposite directions and being spaced by a gap period during which no current flows, said gap periods and said pulse periods together forming a repeated pattern of controlled frequency, picking up the potential between spaced points within the field of influence of said earth current during the current pulse periods, obtaining therefrom a measuring potential proportional to the picked-up potential, picking up during the current gap periods the alternating potential induced between said points by the earth current, periodically reversing the last picked-up potential at said controlled frequency to produce a unidirectional potential, supplying the unidirectional potential to a direct current measuring device and balancing said measuring potential against the potential picked up during the current gap periods to produce a null reading on said measuring device.

HAAKON M. EVJEN.